United States Patent Office 3,058,565
Patented Oct. 16, 1962

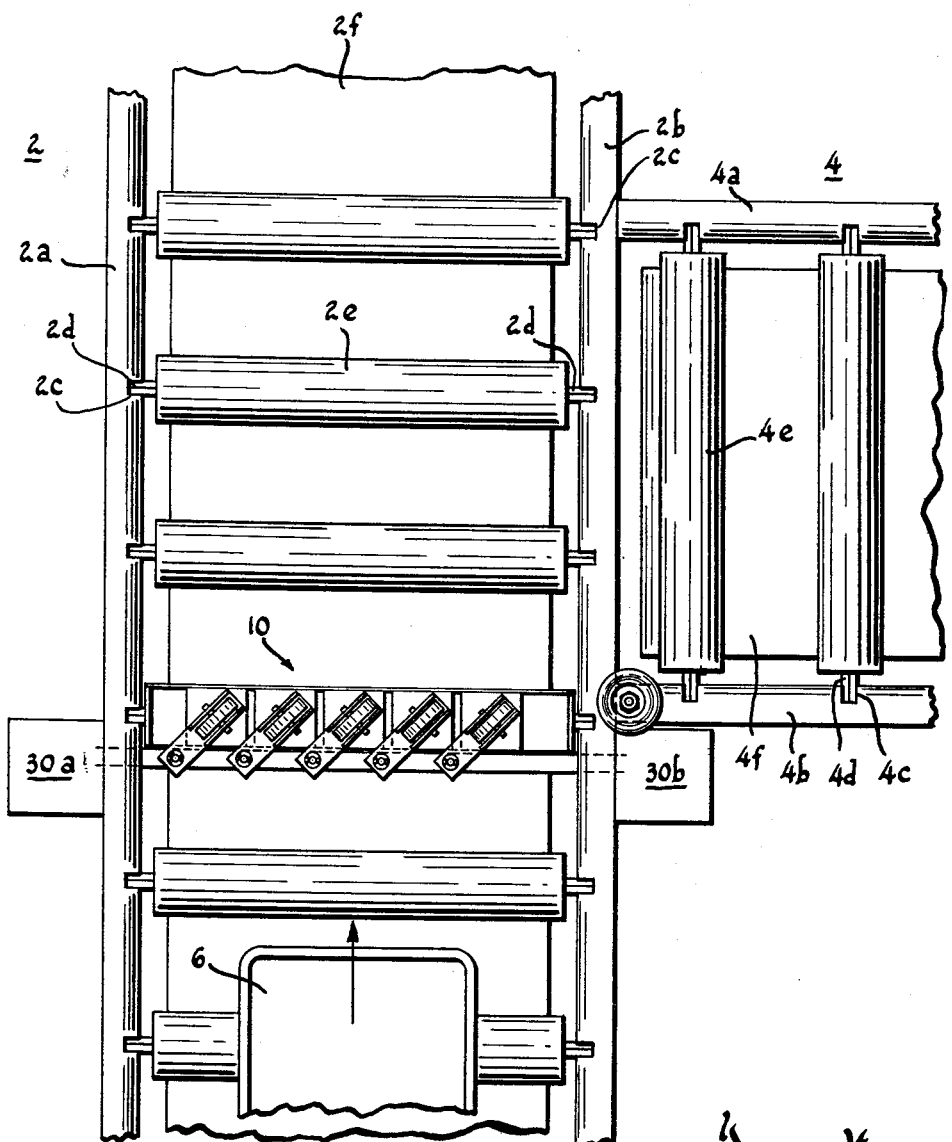

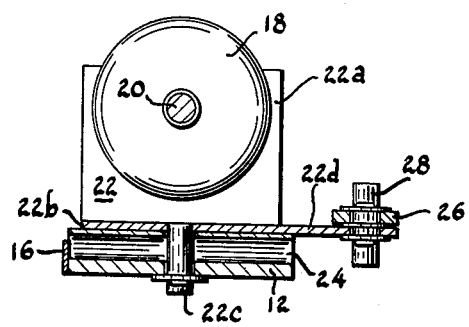
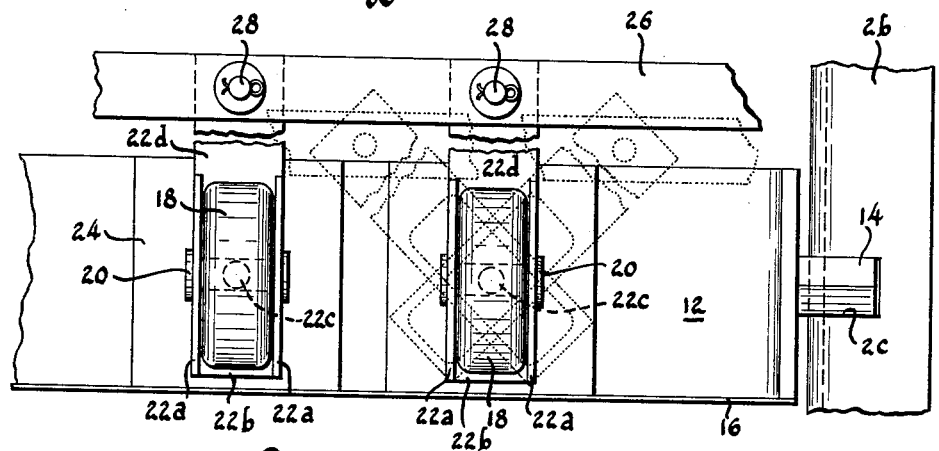
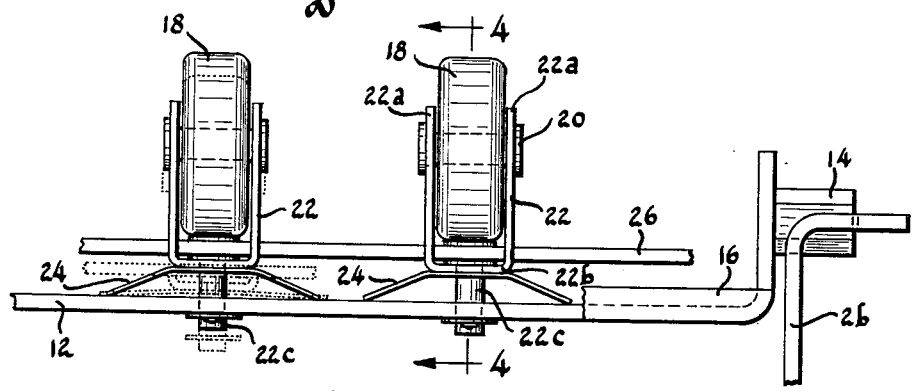

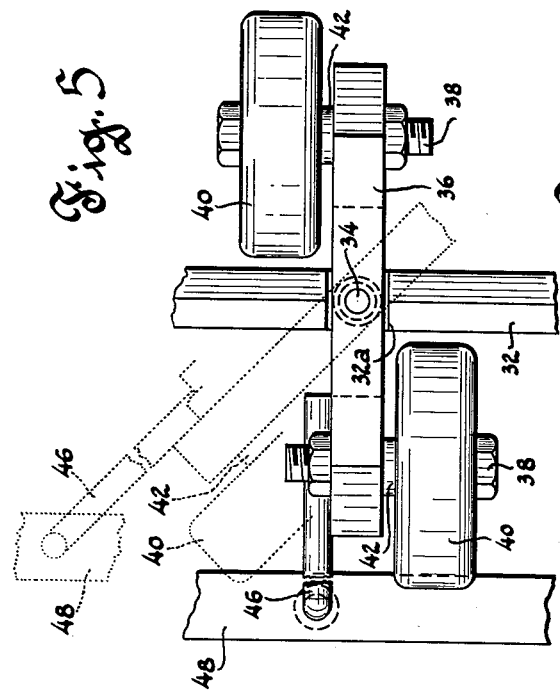
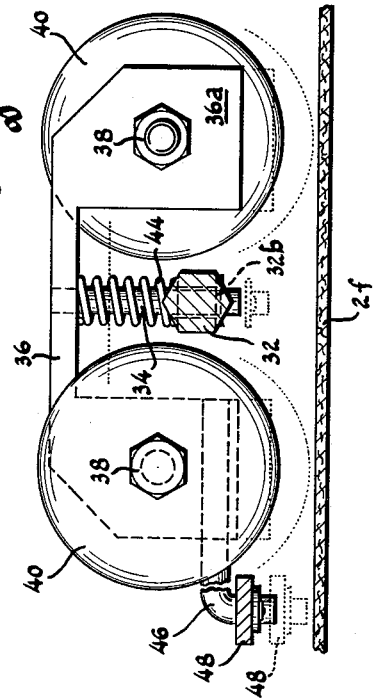
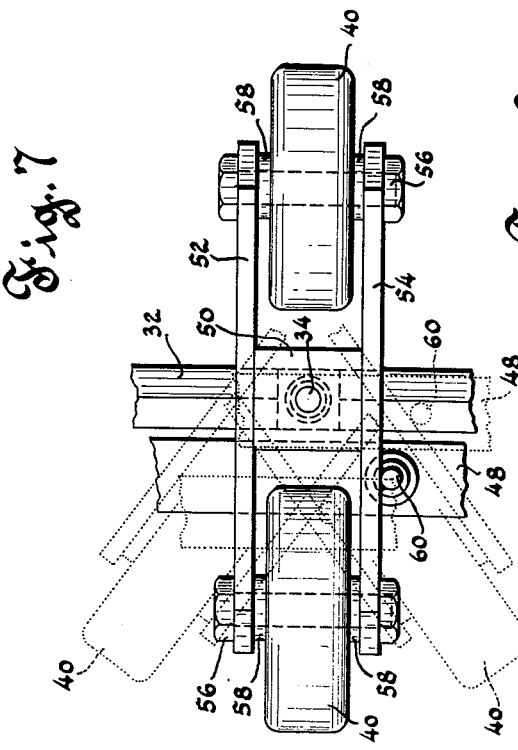
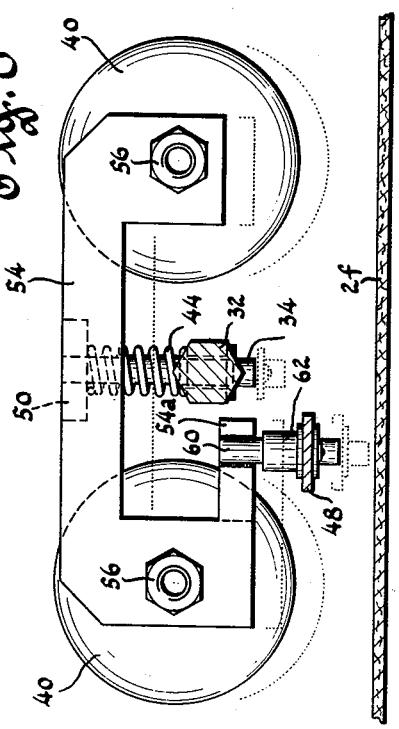

3,058,565
ARTICLE CONVEYORS
Richard J. Byrnes, West Allis, Wis., assignor to Cutler-Hammer, Inc., Milwaukee, Wis., a corporation of Delaware
Filed Feb. 17, 1960, Ser. No. 9,354
9 Claims. (Cl. 193—36)

This invention relates to article conveyors and more particularly to diverter mechanisms therefor.

While not limited thereto, the invention is especially applicable to roller conveyors of the belt driven type or the like for diverting the thing being conveyed such as an article or article carrier from a main conveyor to a branch conveyor which is at a substantially right angle with or parallel to the main conveyor.

An object of the invention is to provide improved diverter mechanisms for a conveyor.

The most specific object of the invention is to provide improved diverter mechanisms which are simple and economical in construction and efficient and reliable in operation.

Another specific object of the invention is to provide an improved diverter device which can be mounted in place of a roller at any desired point along the conveyor or between rollers without significant modification of the conveyor.

A further specific object of the invention is to provide such diverter device which is capable of selectively turning and diverting an article or article carrier or one or more articles of a series thereof from a main conveyor to a branch conveyor which is at a right angle with or parallel to the main conveyor.

Another object of the invention is to provide an improved diverter device which is selectively and electrically operable between non-diverting and diverting positions and which is operable in its diverting position to steer an article substantially frictionlessly from a main conveyor to a branch conveyor which may be on either side of the main conveyor.

A further specific object of the invention is to provide such diverter device which is capable of selectively turning and diverting one or more articles of a series thereof which may be spaced relatively close to one another.

Another object of the invention is to provide a selectively operable diverter device which significantly increases the rate at which articles are diverted from one conveyor to another.

Other objects and advantages of the invention will hereinafter appear.

While the apparatus hereinafter described is effectively adapted to fulfill the object stated, I do not intend to confine my invention to the particular preferred embodiments of diverter mechanisms disclosed inasmuch as they are susceptible of various modifications without departing from the scope of the appended claims.

The invention will now be described in detail with reference to the accompanying drawings wherein;

FIG. 1 is a top view of an article conveyor and diverter mechanism constructed in accordance with the invention;

FIG. 2 is a top view of a diverter mechanism constructed in accordance with the invention and which is capable of diverting an article to either side of the main conveyor;

FIG. 3 is a front elevation view of the diverter mechanism of FIG. 2;

FIG. 4 is a cross-sectional view taken along line 4—4 of FIG. 3;

FIG. 5 is a top view of a modified diverter mechanism;

FIG. 6 is a side elevation view of the diverter mechanism of FIG. 5;

FIG. 7 is a top view of another modification of the diverter mechanism; and

FIG. 8 is a side elevation view of the diverter mechanism of FIG. 7.

Referring to FIG. 1, there is shown an article conveyor consisting of a main conveyor 2 and a branch conveyor 4, the latter extending from the right-hand side of the main conveyor at a right angle. While branch conveyor 4 is shown at a right angle to main conveyor 2, it will be apparent that the branch conveyor could as well be arranged at an obtuse angle or adjacent to and parallel with the main conveyor. The conveyors are of the well known belt driven roller type and are adapted for conveying an article or article carrier such as, for example, a tray 6 or the like. To this end, main conveyor 2 is provided with a pair of generally shallow U-shaped support or frame members 2a and 2b. These members are arranged on edge with their open sides facing in opposite directions to form side rails for the conveyor. The upper, inner corners of frame members 2a and 2b are provided with equally spaced notches 2c, each notch on member 2a being in lateral alinement with a corresponding notch on member 2b and each such pair of alined notches being adapted to accommodate and securely support the ends of an axle 2d of a roller 2e. The end portions of axle 2d may be provided with suitable flat or partially flat sides to be held against rotation in their associated notches 2c whereas roller 2e is mounted for free rotation on the axle. It will be apparent that rollers 2e are held in their respective positions by gravity and that each such roller may be freely lifted from its notches if it is desired to remove the same. Rollers 2e are frictionally driven by an endless motor driven belt 2f. In conveyors of this type, a plurality of idler rollers, not shown, one for each conveyor roller, are mounted below belt 2f and these idler rollers are staggered relative to rollers 2e to bias belt 2f into frictional engagement with rollers 2e.

Similarly, branch conveyor 4 is provided with a pair of like spaced frame members 4a and 4b, each having notches 4c for receiving the ends of axles 4d of a plurality of spaced rollers 4e. These rollers are frictionally driven by an endless motor driven belt 4f and a plurality of freely rotatable idler rollers, not shown, are mounted in a suitable manner below belt 4f for biasing the belt into frictional engagement with rollers 4e. A freely rotatable guide wheel 8 is journaled on the end of frame member 4b at the entry side of branch conveyor 4 for guiding tray 6 as it turns from the main conveyor to the branch conveyor.

Main conveyor 2 is provided with a diverter mechanism 10 immediately adjacent the entry side of the branch conveyor as shown in FIG. 1. This diverter mechanism is mounted in place of one conveyor roller or, as will be apparent, it may be mounted between two adjacent conveyor rollers. To this end, suitable apertures are provided in supporting members 2a and 2b to receive the diverter operating member hereinafter described.

Referring to FIGS. 2, 3 and 4, there is shown a diverter mechanism capable of diverting a tray from a main conveyor either to a left or to a right branch conveyor. This diverter mechanism may be inserted in place of a single conveyor roller as hereinafter described without substantial modification of the side frame members of the main conveyor. There is provided a shallow generally U-shaped supporting bracket 12 having on each up-turned end thereof an outwardly extending projection 14 of hexagonal cross-section for securely seating in slots 2c in frame members 2a and 2b when a conveyor roller is removed therefrom. The bracket is provided at least along one edge thereof with an upturned flange 16 for strengthening the same and for other reasons hereinafter described.

The bracket has mounted thereon a plurality of equally spaced diverter wheels 18. Each such wheel is rotatably mounted on an axle 20 extending therethrough and through alined holes in up-standing portions 22a of a U-shaped supporting member 22. The bottom portion 22b of supporting member 22 has rigidly secured thereto at its midportion a downwardly extending pivot pin 22c, more clearly shown in FIG. 4, which extends through a hole in bracket 12 and to which it is rotatably secured by a washer and a cotter pin or the like. This U-shaped member 22 is resiliently biased upwardly by a leaf spring 24 having downwardly bent end portions and a central hole for receiving the pin, such leaf spring being between bracket 12 and the bottom of portion 22b U-shaped member 22. The leaf spring is confined against flange 16 to prevent rotation thereof as more clearly shown in FIG. 4. U-shaped member 22 is provided with a laterally extending arm 22d having a hole at its end to form a suitable driving connection to a driving shaft 26. To this end, a connecting pin 28 extends through the holes in shaft 26 and arm 22d and is rotatably secured thereto by suitable washers and cotter pins at opposite ends of the pin.

The shaft 26 is driven in opposite directions to rotate the wheels to the positions shown in dotted lines in FIG. 2 by any suitable means such as for example, a pair of solenoids 30a and 30b shown schematically in FIG. 1, one such solenoid being employed for driving the shaft in the right-hand direction and the other such solenoid being employed for driving the shaft in the left-hand direction from the intermediate non-diverting position shown in FIGS. 2 and 3. When the shaft is moved in the right-hand direction as seen in FIG. 2, the wheels are rotated clockwise to an angle of substantially forty-five degrees from the primary axis of the main conveyor thereby to divert the articles onto a right branch conveyor. When the shaft is moved in the left-hand direction, the wheels are rotated counterclockwise substantially forty-five degrees from the primary axis of the main conveyor to divert the articles onto a left branch conveyor. As shown by the dotted lines in FIG. 3, each wheel may be resiliently depressed downwardly under the weight of the tray against the force of the leaf spring so that the tray will engage the conveyor rollers and the diverting wheels. Also, the leaf spring biases the diverting wheels into engagement with the tray as it passes thereover. Each diverting wheel having its own bias spring, each such wheel will be maintained in engagement with the tray even if the latter has uneven areas in its lower portion.

FIGS. 5 and 6 show a modification of a diverter mechanism for diverting trays from a main conveyor onto a branch conveyor positioned on the right-hand side of the main conveyor. There is provided a supporting rod 32 of elongated form having a hexagonal cross-section or the like for supporting the diverter mechanism and which may be seated at its ends in slots 2c in frame members 2a and 2b in place of a single conveyor roller as hereinbefore described. The supporting rod 32 is provided with one or more pairs of flat surfaces 32a and 32b spaced therealong for receiving the respective wheel units, one unit being shown in FIGS. 5 and 6, one surface 32a being on the upper side of rod 32 and the other surface 32b being on the lower side of the rod in registration with the first surface. A hole extends through rod 32 centrally of these flat surfaces for accommodating a rotatable pivot pin 34 extending downwardly therethrough and having a washer and cotter pin at its lower end for securing the same to the rod. The upper end of pivot pin 34 is rigidly secured to a generally inverted U-shaped bracket 36 at the midportion of the latter so that the legs 36a of the bracket depend on opposite sides of the rod. Each depending leg 36a of the bracket is provided with a horizontal hole for receiving a wheel axle 38 such as a bolt or the like extending therethrough and through wheel 40 to rotatably support the wheel on the axle. A bushing 42 surrounds the axle between bracket 36 and wheel 40 to space the latter from the bracket and to afford free rotation of the wheel. A helical compression spring 44 surrounds pivot pin 34 between rod 32 and the midportion of bracket 36, to resiliently bias the wheel supporting bracket upwardly.

An arm 46 is rigidly secured as by welding at one end thereof to one depending leg 36a of bracket 36 on the opposite side of the latter from the associated wheel 40 and below the wheel axle 38. The arm extends parallel to bracket 36 and the other end thereof is provided with a downwardly bent portion 46a forming a pivotal connection to a driving shaft 48. To this end, bent end portion 46a extends through a hole in shaft 48 and is secured thereto by a washer and cotter pin or the like.

To divert a tray from the main conveyor to a branch conveyor, driving shaft 48 is pulled in the upward direction as seen in FIG. 5 by a suitable electromagnetic mechanism such as that hereinbefore described. As a result, the wheels are rotated clockwise on pin 34 to an angle of substantially forty-five degrees relative to the primary axis of the main conveyor to the position shown in dotted lines in FIG. 5. The wheels are secured to the opposite sides of the depending legs of the bracket as shown in FIG. 5 to provide clearance between the rod and wheel supporting bracket 36 when so rotated to the diverting position. When the tray travels over the diverting wheels, the weight thereof depresses the wheel unit against the force of spring 44 as shown in dotted lines in FIG. 6 so that wheels 40 engage belt 2f and are driven thereby. The spring on each wheel unit also functions to bias the wheels into positive engagement with the bottom of the tray which may be uneven.

In the modification shown in FIGS. 7 and 8, like reference characters have been employed for the parts corresponding to those shown in FIGS. 5 and 6. The modification shown in FIGS. 7 and 8 differs from that shown in FIGS. 5 and 6 in that it is rotatable substantially forty-five degrees in opposite directions to divert the tray either to a left or to a right branch conveyor from the main conveyor. As hereinbefore described, supporting rod 32 may support one or more diverting wheel units spaced therealong, only one wheel unit being shown to avoid complicating the drawing. Each wheel unit is rotatably supported on rod 32 by a pivot pin 34 having a helical compression spring 44 thereon as hereinbefore described.

To afford rotation of the wheel unit in opposite directions, pivot pin 34 is rigidly secured at its upper end to a cross piece 50 connecting the midportions of a pair of spaced parallel wheel supporting bracket 52 and 54, spring 44 being between rod 32 and cross piece 50. Each bracket has a substantially inverted U-shaped configuration and the two legs of each bracket depend on opposite sides of rod 32. Each pair of spaced legs of the respective brackets are provided with alined holes for accommodating a wheel supporting axle 56 such as a bolt or the like extending therethrough and through wheel 40 for rotatably supporting the latter between the brackets. A bushing 58 is provided between each side of each wheel and its associated bracket to space the wheel from the latter and to afford free rotation thereof.

One depending leg of bracket 54 is provided with an integral arm 54a extending inwardly from the extremity of such leg. To this arm adjacent the free end thereof is rigidly secured as by welding a downwardly extending pivot pin 60 to form a pivotal connection with driving shaft 48. The driving shaft lies parallel to supporting rod 32 and is provided with a hole accommodating pivot pin 60 and to which the pivot pin is secured by a washer and cotter pin or the like. The brackets are sufficiently long to provide sufficient space between rod 32 and the adjacent sides of wheels 40 to avoid interference therebetween when the wheels are rotated to the diverting positions.

As shown in dotted lines in FIG. 7, the diverting wheel unit is rotated substantially forty-five degrees clockwise from the primary axis of the main conveyor when the driving shaft is moved in the upward direction and is rotated substantially forty-five degrees counter-clockwise when the driving shaft is moved in the downward direction. The pivot pin 60 depending from the arm of bracket 54 is sufficiently long and a spacer 62 is employed between shaft 48 and arm 54a so that the driving shaft clears the lower end of pivot pin 60 and wheel 40 when the mechanism is moved to its diverting position, as more clearly shown in FIG. 8. Compression spring 44 biases the wheel unit upwardly to engage the tray to be diverted and to maintain engagement therebetween if the bottom of the tray is uneven.

Each of the diverting mechanisms hereinbefore described may be removed merely by lifting the same from the slots in the conveyor frame members and may be placed in any other position in place of a conveyor roller. An essential feature of the invention resides in this ready positioning of the diverter anywhere along the conveyor. Other features reside in the simplicity and economy of construction for example, conventional skate wheels available on the market may be employed for the diverting wheels. It will be apparent that for a given size of conveyor, smaller wheels are employed in the modification shown in FIGS. 1, 2, 3 and 4 than are employed in the other constructions because the conveyor belt is below supporting bracket 12 as seen in FIG. 3. Diverters constructed in the manner hereinbefore described are efficient in operation and effectively turn the article such as a tray from a main conveyor to a branch conveyor or selectively to a left or right branch conveyor. This effective diverting is accomplished whether a row of diverter wheels are employed or whether a single diverter wheel or wheel unit is employed. Moreover the invention hereinbefore described requires minimum modification of a conventional conveyor to adapt the same thereto.

I claim:

1. In a conveyor having a main conveyor for conveying articles therealong and a branch conveyor for receiving and conveying articles diverted from the main conveyor, said main conveyor having a plurality of article supporting and conveying rollers spaced longitudinally thereof, the improvement comprising a diverter mechanism mounted in place of a single roller on the main conveyor, said diverter mechanism comprising a supporting member mounted across the main conveyor, a row of rotatable wheels mounted on said supporting member, means for normally supporting said wheels so that their vertical planes are coincident with the direction of travel of the articles along the main conveyor to allow passage of the articles thereover along the main conveyor, and electroresponsive means for pivoting said wheels in either direction from said direction of travel toward the branch conveyor so that their vertical planes are at a predetermined angle in the selected direction from such direction of travel thereby to cause turning and diverting of the articles to the branch conveyor.

2. In a conveyor having a main conveyor for conveying articles therealong and a branch conveyor for receiving and conveying articles diverted from the main conveyor, said main conveyor having a plurality of article supporting and conveying rollers spaced longitudinally thereof, the improvement comprising a diverter mechanism mounted between a pair of adjacent rollers on the main conveyor, said diverter mechanism comprising an elongated supporting member mounted transversely of the main conveyor in place of a conveyor roller, a plurality of diverting wheels arranged along said supporting member, pivotal means mounting said wheels on said supporting member to engage the bottom of the article, said wheels having a normal position coincident with the direction of travel of the articles along the main conveyer and diverting positions at predetermined angles in opposite directions from their normal position, and electroresponsive means for selectively pivoting said wheels from their normal position to either said diverting position wherein said wheels engage the bottom of the article and cause turning thereof onto the branch conveyor.

3. In a conveyor of the roller type for conveying articles therealong and having a plurality of article supporting and conveying rollers spaced longitudinally thereof, the improvement comprising a diverter mechanism mountable at any point along the conveyor in place of one of the rollers, said diverter mechanism comprising, a row of diverting wheels arranged across the conveyor and resiliently biased a predetermined amount above the upper level of the adjacent rollers to engage the bottom of the article being conveyed, said wheels having a normal position allowing movement of the articles thereover along the conveyor, and means for selectively pivoting said wheels to predetermined angles in opposite directions from said normal position to cause turning and diverting of an article in either of opposite transverse directions off the conveyor.

4. The invention defined in claim 3, wherein said diverter mechanism further comprises supporting means mounted in place of a single conveyor roller for supporting said wheels substantially centrally between the lateral sides of the conveyor for rotation about horizontal axes, said supporting means comprising means pivotally supporting said wheels for rotation about vertical axes, and electroresponsive means for selectively rotating said wheels about said vertical axes from a non-diverting position in line with the conveyor to diverting positions at a predetermined angle in opposite directions toward opposite sides of the conveyor.

5. The invention defined in claim 3, wherein said wheels are arranged transversely of the conveyor and each wheel being resiliently biased a small amount above the upper level of the conveyor rollers, said diverter mechanism further comprising an elongated member mounted in place of a conveyor roller for supporting said wheels in spaced apart relation, bracket means for each wheel having a portion extending laterally therefrom, said bracket means being mounted on said elongated member for pivoting about a vertical axis, said bracket means having a portion for supporting said wheel for rotation about a horizontal axis, spring means biasing said bracket means to bias each wheel a small amount above the upper level of the conveyor rollers to engage the bottom of the article being conveyed, and electroresponsive means comprising an actuator engaging said laterally extending portions for pivoting said bracket means to pivot said wheels about their vertical axes from a non-diverting position in line with the conveyor to diverting position toward either side of the conveyor each of which is substantially forty-five degrees from said non-diverting position.

6. The invention defined in claim 3, wherein said wheels are arranged transversely of the conveyor and each wheel being resiliently biased a small amount above the upper level of the conveyor rollers, said diverter mechanism further comprising a supporting bracket mounted in place of a conveyor roller, a U-shaped member for each wheel, a journal for supporting each wheel between the upwardly extending legs of its U-shaped member for rotation on a horizontal axis, the yoke portion of each such U-shaped member having a downwardly extending pivot pin for supporting the same on said bracket and for pivoting on a vertical axis, spring means for biasing each said U-shaped member upwardly from said bracket, each such U-shaped member further having an arm extending laterally of said bracket, and an actuator member connected to said arms for pivoting said wheels on said vertical axes in response to axial movement of said actuator member.

7. The invention defined in claim 3, wherein said diverter mechanism comprises a double row of wheels arranged transversely of the conveyor and resiliently biased a small amount above the upper level of the conveyor rollers, an elongated supporting member mounted in place of a conveyor roller, an inverted U-shaped bracket means for supporting each pair of wheels, one wheel of such pair being in each such row, the wheels of each such pair being journaled on the depending legs of said inverted U-shaped bracket means for free rotation on a horizontal axis, a pivot pin extending downwardly from the yoke portion of each said bracket means between the depending legs thereof for supporting the same on said elongated supporting member in spaced apart relation and for pivoting on a vertical axis, a helical spring surrounding said pivot pin for biasing said bracket means upwardly so that said wheels engage the bottom of the article traveling thereover, each said bracket means having an arm extending therefrom transversely of said elongated supporting member, and an actuator member coupled to said arms for pivoting each pair of wheels on its vertical axis in response to movement of said actuator member.

8. In a conveyor of the roller type for conveying articles therealong and having a plurality of article supporting and conveying rollers spaced longitudinally thereof, the improvement comprising a diverter mechanism mounted at a selected point along the conveyor between a pair of conveyor rollers, said diverter mechanism comprising an elongated supporting member arranged transversely of the conveyor, a plurality of diverting wheel units spaced along said supporting member with the wheels of each such unit being resiliently biased a small amount above the upper level of the adjacent conveyor rollers, each said wheel unit comprising a pair of inverted U-shaped brackets arranged parallel to one another, a connecting member integral with and connecting the midportions of said brackets, a diverting wheel journaled between each spaced pair of depending legs of said brackets for free rotation on a horizontal axis, a pivot pin extending downwardly from said connecting member between the brackets of said pair for supporting the latter on said elongated supporting member and for pivoting on a vertical axis, a helical spring surrounding said pivot pin for biasing said wheel unit upwardly so that said wheels engage the bottom of the article traveling thereover, and one of said brackets having an arm extending therefrom transversely of said elongated supporting member, and an actuator member coupled to each said arm for pivoting each said wheel unit on its vertical pivot pin to a predetermined angle relative to the primary axis of the conveyor to cause turning and diverting of an article off the conveyor.

9. In a conveyor of the roller type for conveying articles therealong and having a plurality of article supporting and conveying rollers spaced longitudinally thereof, the improvement comprising:

(a) a diverter mechanism mountable at any point along the conveyor in place of one of the rollers, said diverter mechanism comprising;

(b) a row of diverting wheels arranged across the conveyor, said wheels having a normal position in the direction of the conveyor allowing movement of the articles thereover along the conveyor;

(c) a supporting member mounted in place of a conveyor roller;

(d) substantially U-shaped supporting means for each wheel in said row;

(e) a journal for supporting each said wheel on its associated supporting means for rotation on a horizontal axis;

(f) each said supporting means comprising means for pivotally supporting the same on said supporting member for limited rotation on a vertical axis;

(g) means biasing each said U-shaped supporting means upwardly to bias its associated wheel a small amount above the upper level of the adjacent conveyor rollers to engage the bottom of the article being conveyed;

(h) and electroresponsive actuator means connected to said U-shaped supporting means for pivoting said wheels about said vertical axes to a diverting position toward a side of the conveyor substantially forty-five degrees from said normal position.

References Cited in the file of this patent

UNITED STATES PATENTS

| | | |
|---|---|---|
| 2,077,190 | Rishel | Apr. 13, 1937 |
| 2,136,267 | Taylor | Nov. 8, 1938 |
| 2,216,504 | Sekulski | Oct. 1, 1940 |
| 2,396,079 | Bowen | Mar. 5, 1946 |
| 2,566,417 | Holm | Sept. 4, 1951 |
| 2,613,790 | Schottelkotte | Oct. 14, 1952 |
| 2,985,274 | Byrnes et al. | May 23, 1961 |
| 2,988,196 | Byrnes et al. | June 13, 1961 |